(12) United States Patent
Wang et al.

(10) Patent No.: US 9,868,098 B2
(45) Date of Patent: Jan. 16, 2018

(54) FLUIDIZED BED GRANULATION

(71) Applicant: Green Granulation Technology Limited, Hong Kong (CN)

(72) Inventors: Wei Wang, Beijing (CN); Mengguang Wang, Newark, DE (US)

(73) Assignee: GREEN GRANULATION TECHNOLOGY LIMITED, Hong Kong (CN)

( * ) Notice: Subject to any disclaimer, the term of this patent is extended or adjusted under 35 U.S.C. 154(b) by 848 days.

(21) Appl. No.: 14/173,361

(22) Filed: Feb. 5, 2014

(65) Prior Publication Data

US 2015/0217248 A1 Aug. 6, 2015

(51) Int. Cl.
*B01D 1/18* (2006.01)
*B01J 2/16* (2006.01)

(52) U.S. Cl.
CPC . *B01J 2/16* (2013.01); *B01D 1/18* (2013.01)

(58) Field of Classification Search
CPC .................................... B01D 1/18; B01J 2/16
USPC ........................................................ 159/4.04
See application file for complete search history.

(56) References Cited

U.S. PATENT DOCUMENTS

| | | | | |
|---|---|---|---|---|
| 4,619,843 A | | 10/1986 | Mutsers | |
| 5,085,170 A | * | 2/1992 | Huttlin | B01J 2/16 118/303 |
| 5,120,345 A | * | 6/1992 | Kayaert | B01J 2/16 71/30 |
| 5,653,781 A | * | 8/1997 | Kayaert | B01J 2/16 71/28 |
| 6,125,552 A | * | 10/2000 | Braun | B01J 2/16 34/329 |
| 6,203,730 B1 | * | 3/2001 | Honda | B01J 2/16 118/303 |
| 6,290,775 B1 | * | 9/2001 | Kohlen | B01J 2/16 118/303 |
| 7,344,663 B2 | * | 3/2008 | Nishikawa | B01J 2/16 118/303 |
| 7,993,595 B2 | * | 8/2011 | Jacob | B01J 2/16 23/313 FB |
| 8,197,729 B2 | * | 6/2012 | Kojima | B01J 2/16 264/12 |
| 8,834,142 B2 | | 9/2014 | Kojima et al. | |
| 2006/0151646 A1 | | 7/2006 | Bedetti | |

(Continued)

FOREIGN PATENT DOCUMENTS

CN 1812832 A 8/2006
CN 101422713 A 5/2009

(Continued)

OTHER PUBLICATIONS

Written Opinion and Search Report of NL 2009297, dated Aug. 8, 2012.

(Continued)

*Primary Examiner* — Jonathan Miller
(74) *Attorney, Agent, or Firm* — Steven M. Koehler; Westman, Champlin & Koehler, P.A.

(57) ABSTRACT

A fluidized bed granulator comprising one or more compartments with a floor with openings for the supply of a fluidization medium and a plurality of sprayers. The sprayers are connected to a supply of a granulating liquid and are configured to spray the liquid in one or more spraying zones next to one or more unsprayed zones of the fluidized bed.

16 Claims, 3 Drawing Sheets

(56) References Cited

U.S. PATENT DOCUMENTS

| | | | |
|---|---|---|---|
| 2007/0116769 A1* | 5/2007 | Bach | B01J 2/006 424/489 |
| 2009/0123665 A1* | 5/2009 | Zaima | B01J 2/16 427/595 |
| 2010/0285214 A1 | 11/2010 | Zardi | |
| 2011/0315079 A1* | 12/2011 | Perpar | B01J 2/16 118/716 |

FOREIGN PATENT DOCUMENTS

| | | |
|---|---|---|
| CN | 101984748 A | 3/2011 |
| EP | 2077147 | 7/2009 |
| GB | 1455892 A | 11/1976 |

OTHER PUBLICATIONS

Chinese Office Action for Chinese patent application No. 201310442474.7, dated Apr. 19, 2016.

* cited by examiner

FLUIDIZED BED GRANULATION

BACKGROUND

The discussion below is merely provided for general background information and is not intended to be used as an aid in determining the scope of the claimed subject matter.

Aspects of the present invention relate to a fluidized bed reactor and a process for the production of granules, such as granules of urea or ammonium nitrate, typically used as a fertilizer material.

To reduce agglomeration problems during storage of urea granules, the water content in the final granules should be low, for instance below 0.25% by total weight of the granules.

To produce drier granules the residence time in the granulator can be increased, e.g., by using higher bed levels. However, this requires higher pressures of the fluidization air and, consequently, more power consumption.

Alternatively, the water content can be reduced by atomizing the urea solution to finer droplets. This requires more air to atomize the urea solution and, consequently, more power consumption.

Lower water contents of the final granules can also be achieved by spraying a more concentrated urea solution. EP-A 0 289 074, for instance, teaches to use a solution with a urea content of 70-99.9 wt %. However, the use of low water content urea concentrates reduces the cooling effect of water evaporation. To compensate for this, cooling by air should be increased by higher flow speeds of the air used for fluidization. Consequently, also this option results in higher energy consumption.

A fluidized bed granulator and a process resulting in dry granules without requiring high energy consumption can be beneficial.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A fluidized bed granulator includes one or more compartments with a floor with openings for the supply of a fluidization medium and a plurality of sprayers connected to a supply of a granulating liquid, such as an aqueous urea solution. The sprayers are configured to spray the liquid in one or more spraying zones next to one or more unsprayed zones of the fluidized bed. By creating unsprayed zones in the compartment outside the scope of the sprayers, the nuclei will swirl down until they swirl back upwards with the flow induced by the sprayers.

Surprisingly, it has been found that such an inhomogeneous distribution of the sprayers results in granules with a very low water content, while the overall energy consumption of the process can be kept low. The water content of the granules produced with the granulator can be well below 0.3 wt % by total weight of the granules, or even below 0.25 wt %.

In a specific embodiment, the sprayers are spaced at uneven distances from each other. Optionally, the sprayers are arranged in clusters, wherein the shortest distance between sprayers in a cluster is less than the shortest distance between two clusters. Good results are obtained if these clusters extend parallel in a main flow direction of the nuclei. The main flow direction is the horizontal direction of the nuclei from the granulator inlet to the outlet, without the swirling imparted by the fluidization medium. In such a configuration the distance between parallel clusters may for instance be about 0.5-1 meter, while the distance between sprayers in a cluster can for example be about 0.1-0.4 meter. The distance between clusters can for instance be about 2-3 times the distance between sprayers within a cluster. Other distances can also be used, if so desired. Alternatively, or additionally, the unsprayed zones outside the sprayer scope can be created by directing the sprayers in different directions, e.g., away from each other. In that case, the sprayers can be distributed homogeneously or inhomogeneously.

In a specific embodiment, the sprayer density in at least one of the compartments is at least 7 sprayers per $m^2$, whereas the density per cluster of sprayers is at least 25 sprayers per $m^2$. Optionally, the granulator comprises a first compartment with a sprayer density of at least 9 sprayers per $m^2$ whereas the density per cluster of sprayers in the first compartment is at least 29 sprayers per $m^2$, and at least one further compartment with a sprayer density of at least 7 sprayers per $m^2$, whereas the density per cluster of sprayers is at least 25 sprayers per $m^2$. Other configurations can also be used, if so desired.

The sprayers can for example be atomizers or hydraulic sprayers, such as air-assisted hydraulic sprayers. Combinations of these types of sprayers can also be used. A suitable type of sprayer is for instance disclosed in U.S. Pat. No. 4,619,843, which is herein incorporated by reference in its entirety.

When the solution is sprayed into the granulator compartment, the solution may for instance have a temperature substantially above the crystallisation point. If the solution is a urea solution the solution can for instance be sprayed at a temperature of at least about 120° C., or at least about 130° C. or at least about 135° C. If the solution is an ammonium nitrate solution the solution can for instance be sprayed at a temperature of at least about 160° C., or at least about 170° C. or at least about 180° C. The solution can for example be sprayed under a hydrostatic pressure of 1.5-6 bar, e.g., 2-4 bar or other suitable pressures. The sprayed droplets can for example have an average droplet size of about 20-120 μm, e.g., about 30-60 μm.

For granulation of urea, highly concentrated solutions can be used, for example with a urea content of at least 90 wt % by total weight of the urea solution, e.g., at least 95 wt %.

The water content of the urea solution is generally low, e.g., less than 5 wt %, by total weight of the urea solution, e.g., less than 3 wt %. If the water content is less than 2.5 wt % the solution is often referred to as urea melt.

The urea solution may further contain additives such as for example formaldehyde and/or a urea-formaldehyde condensation products as a granulating aid for slowing down crystallisation of the urea and as an anti-caking agent preventing agglomeration of the resultant granules. If for instance 0.1 to 3%, based on total the weight of the urea solution, of formaldehyde is added to the urea aqueous solution, atomized liquid droplets adhere better to the urea nuclei. Other suitable additives can also be used.

For the granulation of ammonium nitrate, $Mg(NO3)2$ and aluminium sulphate, e.g., with NaOH are examples of suitable additives.

The nuclei can be supplied to the granulator via one or more inlets at an inlet side of the granulator. The nuclei can either be supplied continuously or be supplied and processed per batch.

Before being submitted to the granulation process, the nuclei may have any suitable average particle size, generally about at least 0.2 mm, or at least 0.5 mm, generally at most 6 mm.

The nuclei may have any suitable composition. In general they will mainly comprise the same material as the crystallized granulating liquid, in particular crystallized urea, but is also possible to use nuclei of a different composition than the crystallized granulating liquid.

Generally air is used as a fluidization agent. However, other suitable fluidization gases can also be used. For granulating urea the flow velocity of the fluidization gas in the fluidized bed can for example be about 1-8 m/sec, e.g., at least about 2 and/or at most about 3 or 4 m/sec. For granulating ammonium nitrate the flow velocity of the fluidization gas in the fluidized bed can for example be about 1-8 m/sec, e.g., at least about 2 and/or at most about 3.5 or 4.5 m/sec. The fluidization gas can enter the granulator under any suitable pressure, for example 300-900 mm water column, e.g., 400-600 mm water column, and with any suitable temperature, but preferably below about 140° C. or below about 110° C.

For urea granulation the temperature in the compartments of the granulator can for instance be between 90-120° C., e.g., between 100-106° C. For granulation of ammonium nitrate the temperature in the compartments of the granulator can for instance be between 110-140° C., e.g., between 125-130° C. Typically, the temperature in the first compartment will be lower due to the return flow of recycled material. This can be compensated by using a higher density of sprayers in the first compartment.

The fluidized bed may for example have a bed level of 1.5 m or less, e.g., about 1 m or less.

The processed granules are typically discharged via one or more outlets of the granulator, either continuously or per batch. The processed granules typically have an average particle size of about 2-4 mm, but can be made smaller or larger if so desired. The water content of the granules can be kept well below 0.3 wt % by total weight of the granules, e.g., below 0.25 wt %.

Granules with a particle size above a given limit can be separated from the outflow. Optionally, these particles can be crushed and recycled to the granulator, e.g., together with granules with a particle size considered to be too small and/or with material separated from air discharged from the granulator.

The granulator can have one or more granulator compartments in a serial and/or parallel arrangement. In a specific embodiment, the granulator has at least two, e.g., three or more serially arranged compartments.

The floors of the granulator compartments provide inlets for a fluidization agent. To this end, the floor can for instance be a grid above an air supply.

Optionally, the granulator may comprise an aftercooler, such as a fluidized bed cooler receiving discharged granules from the granulator compartments. The aftercooler can for example be used to cool the granules to a temperature of about 40° C.

The granulator is particularly useful for a process for the production of granules wherein a granulating liquid is sprayed into the compartment in spraying zones of the fluidized bed alternated with non-spraying zones.

Each spraying zone can for example generated by a cluster of sprayers. In the spraying zones the granulating liquid flows upwardly. The unsprayed zones are not within the scope of a sprayer and allow the nuclei to flow down. It has been found that the nuclei flow faster through the spraying areas, so less fresh solution settles down on the nuclei each time they pass a spraying zone. The thinner layers of solution allow better evaporation of the water content. In the unsprayed zones the nuclei flow down and recycle to the spraying zones. As a result, the nuclei pass the spraying zones a large number of times. Each time they pass a spraying zone, they collect a further coating of the sprayed solution. Eventually this results in a granulate of the desired size with low residual moisture content. As a consequence, the mean residence time of the nuclei in the granulator can be reduced, so the level of the fluidized bed can be kept low, which in turn requires less pressure of the fluidization air and less power consumption.

The process can for example be carried out as a continuous process with the material of the fluidized bed moving in a flow direction from one or more inlets to one or more outlets of the granulator, the spraying zones being parallel to the flow direction.

Good results are obtained if the process is carried out in such a way that the shortest distance between two sprayers at opposite sides of a non-spraying zone is at least half the height of the fluidized bed contained in the respective compartment.

BRIEF DESCRIPTION OF THE DRAWINGS

An exemplary embodiment of a granulator will be explained under reference to the accompanying drawings.

DETAILED DESCRIPTION OF ILLUSTRATIVE EMBODIMENTS

Figure 1:
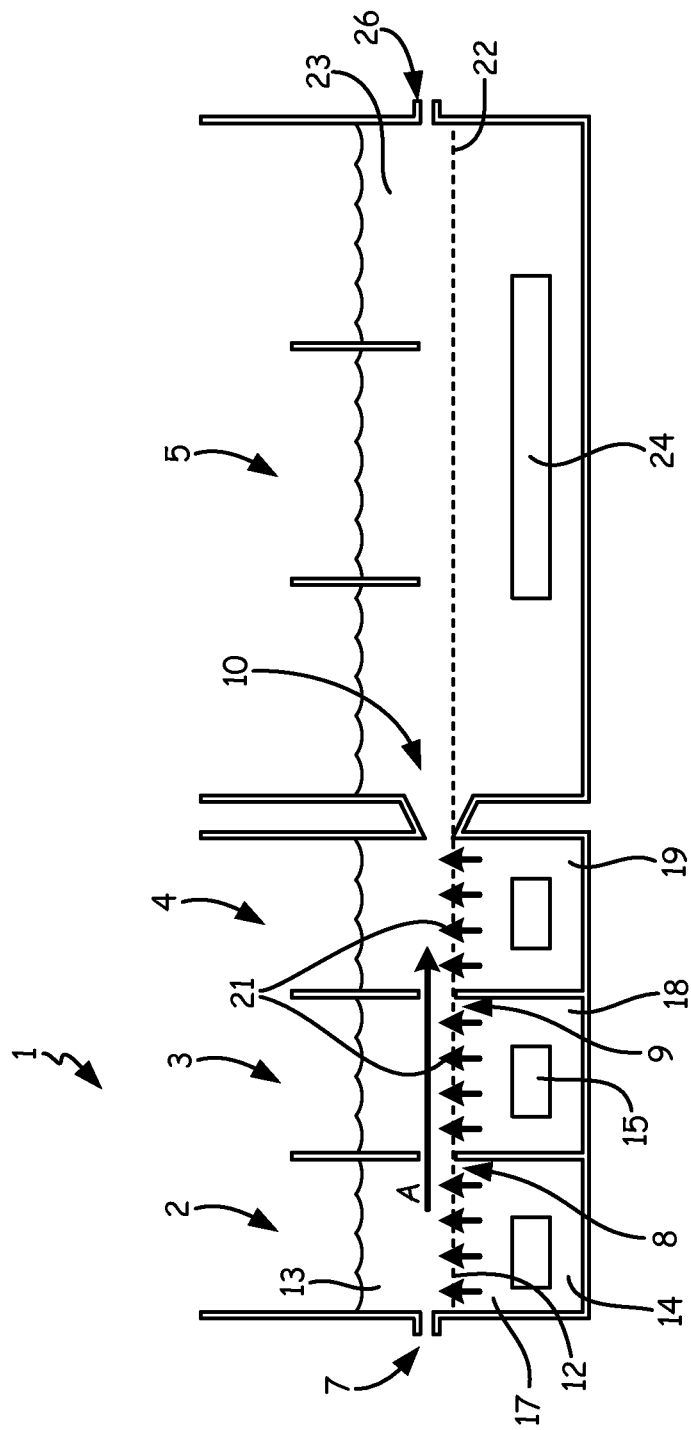
FIG. 1: shows a cross section along flow direction of a granulator.

FIG. 1 shows an exemplary embodiment of a granulator 1 for the production of urea granules, or ammonium nitrate granules. The granulator 1 is divided into three compartments 2, 3, 4 for granulation and a compartment 5 for subsequent cooling and drying the granules.

The first compartment 2 of the granulator 1 comprises an inlet 7 for the supply of nuclei. Opposite to the inlet 7 is a first passage 8, leading to the second compartment 3. The second compartment 3 comprises a second passage 9 opposite to the first passage 8 and leading to the third compartment 4. The third compartment 4 comprises an outlet 10 opposite to the second passage 9. As a result, the nuclei can flow from the inlet 7 to the outlet 10 in a straight flow path, indicated in FIG. 1 by arrow A.

The granulator 1 comprises a floor 12 made of a grid which supports a bed 13 of nuclei and which permits the passage of a fluidization agent, such as air, supplied from a space 14 below the grid floor 12 and preheated by heaters 15 in the space 14. The heated air fluidizes the bed 13 of nuclei.

The space 14 below the grid floor 12 is divided into compartments 17, 18, 19 in line with the compartments 2, 3, 4 above the grid floor 12. In each of the compartments 2, 3, 4 the grid floor 12 of the granulator 1 is provided with clusters of air-assisted sprayers 21 projecting above grid floor 12. The sprayers 21 spray an aqueous solution of urea into the fluidized bed 13. In the granulator compartments 2, 3, 4 water of the sprayed urea solution evaporates and urea crystallizes on the nuclei, which grow to form granules.

The aftercooler 5 is a fluidized bed cooler with a grid floor 22 supporting a bed 23 of freshly produced granules and a space below the grid floor 22 with a heater 24 for the supply of air fluidizing and drying the bed 23.

Air and air borne dust particles are discharged from the granulator compartments 2, 3, 4 and the aftercooler 5. The air can be stripped, e.g., in a scrubber and/or cyclone or a similar separator. Separated dust particles can be recycled to the granulator.

The aftercooler 5 is provided with an outlet 26 for discharging the dried and cooled granules. Subsequently, undersize and oversize granules are separated from granules of the desired size, which are discharged for storage. The oversize granules can be crushed to finer particles, which can be recycled together with the undersize particles.

Figure 2:
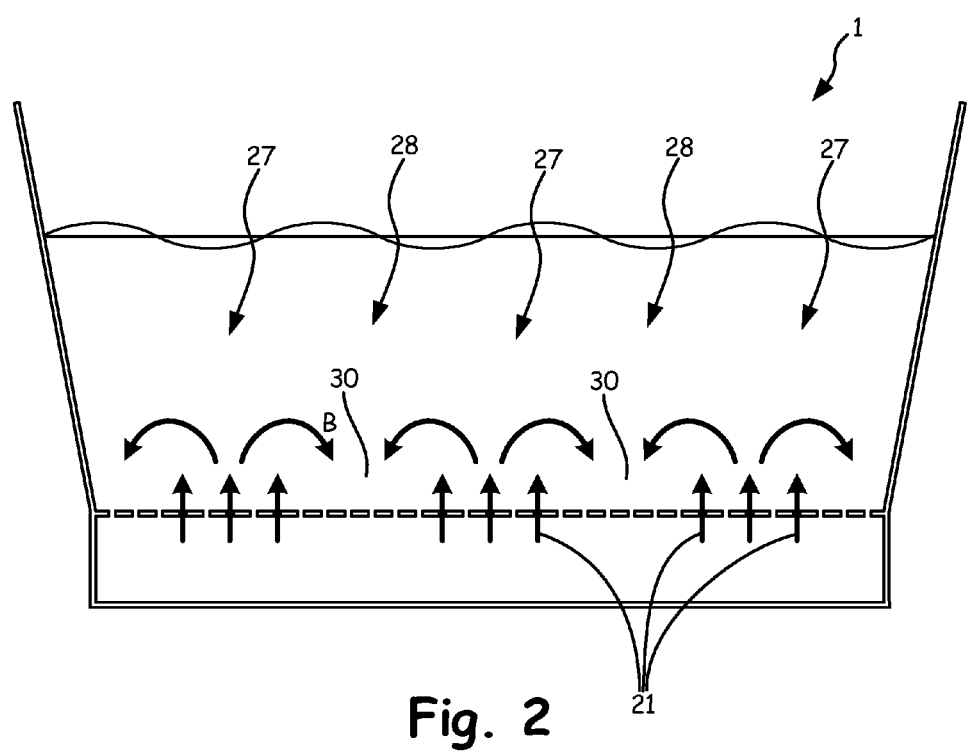
FIG. 2: shows a cross section perpendicular to flow direction of the granulator of FIG. 1.

FIG. 2 shows the granulator 1 in a cross section through a plane perpendicular to the flow direction A. In the shown embodiment, the sprayers 21 in a compartment are arranged in three clusters 27 with spacings 28 between the clusters 27. Each cluster 27 generates a spraying zone 29 where an upward flow of the nuclei is induced by the air assisted sprayers 21. The spacings 28 between the clusters 27 form unsprayed zones 30 without atomising air where the nuclei tend to flow downward (arrows B in FIG. 2).

Figure 3:
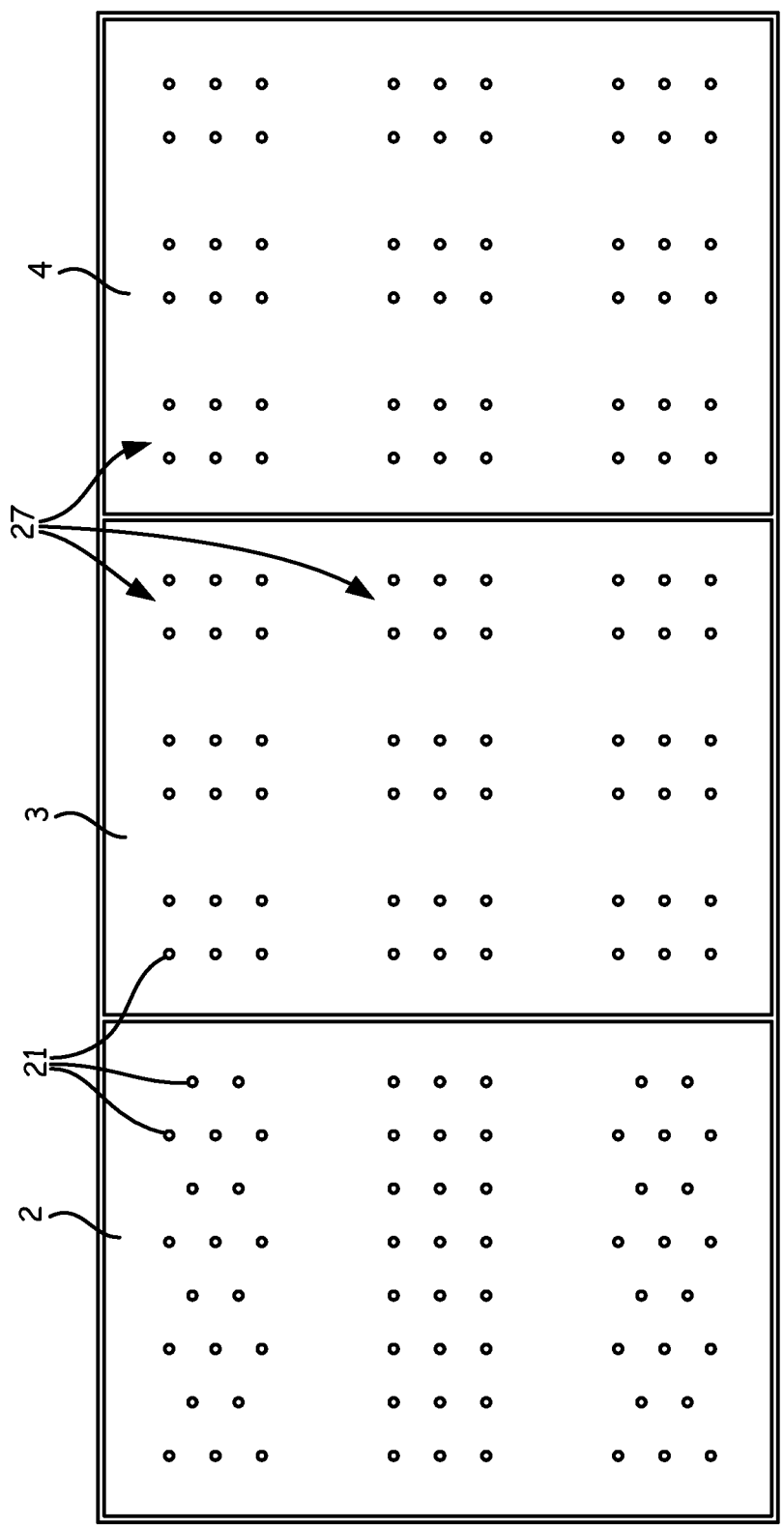
FIG. 3: shows the granulator of FIG. 1 in plan view.

The arrangement of the sprayers 21 is shown in plan view on FIG. 3. In this exemplary embodiment, the first compartment 2 comprises 64 sprayers 21 arranged in three parallel clusters 27. In a compartment with a width of 3 m and a length of 2.35 m, this means an average sprayer density of more than 9 sprayers per m². The clusters 27 in the first compartment have the same width and the same length. The middle cluster 27 comprises 3 rows of 8 sprayers. The other two clusters comprise 8 columns alternately having two and three sprayers, respectively, adding up to a total of 16 sprayers per cluster. With a cluster width of 0.4 m and a cluster length of 1.7 m, the sprayer density in the middle cluster would be above 35 sprayers per m², while the sprayer density in the two other clusters would be above 29 sprayers per m².

The second and third compartments 3, 4 have three parallel clusters 27 with 18 sprayers per cluster. With a cluster width of 0.4 m and a cluster length of 1.7 m, the sprayer density in these clusters 27 would be above 26 sprayers per m². In a compartment with a width of 3 m and a length of 2.35 m, this means an average sprayer density of more than 7 sprayers per m². In each cluster 27 of the second and third compartment 3, 4 the clusters 27 have six columns of three sprayers 21. The distances between the second and the third row and the fourth and fifth column are larger than the distances between the other columns.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A fluidized bed granulator comprising a compartment with walls and a floor with an inlet for nuclei, the floor having a plurality of openings for a supply of a fluidization medium and a plurality of individual sprayers connected to a supply of a granulating liquid, the sprayers being arranged at spaced apart positions on the floor, wherein the sprayers are configured to spray the granulating liquid in one or more parallel linear spraying zones extending over the floor between a first wall and a second wall alternating with one or more unsprayed zones of the fluidized bed granulator and wherein the sprayers are arranged in clusters.

2. The granulator according to claim 1 wherein the sprayers are spaced at uneven distances from each other.

3. The granulator according to claim 2 wherein the shortest distance between adjacent sprayers in a cluster is less than the shortest distance between two adjacent clusters.

4. The granulator according to claim 1 wherein a distance between parallel clusters is about 0.4-1 meter.

5. The granulator according to claim 3, wherein the distance between sprayers in a cluster is about 0.1-0.4 meter.

6. The granulator according to claim 3, wherein for at least a part of the sprayers the distance between clusters is about 2-3 times the distance between sprayers within a cluster.

7. The granulator according to claim 1 wherein a sprayer density in the compartment is at least 7 sprayers per m², whereas a density per cluster of sprayers is at least 25 sprayers per m².

8. The granulator according to claim 7 wherein the compartment has a sprayer density of at least 9 sprayers per m² whereas the density per cluster of sprayers in the compartment is at least 29 sprayers per m².

9. The granulator according to claim 1 wherein the floor is a grid floor.

10. The granulator according to claim 1, wherein an outlet of the granulator opens into an aftercooler.

11. The granulator according to claim 10 wherein the aftercooler is a fluidized bed cooler.

12. The granulator according to claim 7 and further comprising a second compartment configured to receive nuclei from the compartment and to provide nuclei for discharge through an outlet, the second compartment having a second plurality of openings for a supply of the fluidization medium and a second plurality of sprayers connected to the supply of the granulating liquid, wherein the second plurality of sprayers are configured to spray the granulating liquid in the second compartment in one or more spraying zones next to one or more unsprayed zones, wherein the second plurality of sprayers are arranged in clusters and wherein the clusters are parallel clusters extending in a flow direction for nuclei.

13. The granulator according to claim 12 wherein a sprayer density of the second plurality of sprayers is at least 7 sprayers per m², whereas the density per cluster of sprayers of the second plurality of sprayers is at least 25 sprayers per m².

14. A fluidized bed granulator comprising a compartment with a floor with openings for a supply of a fluidization medium and a plurality of individual sprayers connected to a supply of a granulating liquid, wherein the sprayers are configured to spray the granulating liquid in one or more spraying zones next to one or more unsprayed zones of the fluidized bed granulator, wherein a distance between sprayers in a cluster is 0.1 to 0.4 meter.

15. A fluidized bed granulator comprising a compartment with a floor with an inlet for nuclei, a plurality of openings for a supply of a fluidization medium and a plurality of individual sprayers connected to a supply of a granulating liquid, the compartment defining a flow direction for nuclei from said inlet to an outlet, wherein the sprayers are configured to spray the granulating liquid in one or more spraying zones next to one or more unsprayed zones of the fluidized bed granulator, wherein the sprayers are arranged in clusters and wherein sprayers of each cluster are arranged in parallel lines extending in said flow direction.

16. A fluidized bed granulator comprising a compartment with a floor and with an inlet for nuclei, the floor having a plurality of openings for a supply of a fluidization medium and a plurality of individual sprayers connected to a supply of a granulating liquid wherein the sprayers are arranged in clusters parallel to each other, each cluster being elongated and comprising first sprayers at a first end of the cluster and second sprayers at a second end of the cluster with further sprayers spaced apart from each other and disposed between the first sprayers and the second sprayers, and wherein at least one unsprayed zone also extends between adjacent parallel clusters, the unsprayed zone defined by being free of sprayers wherein a transverse spacing, transverse to the elongation of the clusters, between two adjacent clusters exceeds intra-transverse spacing, transverse to elongation of the clusters, between the sprayers within each respective cluster.

* * * * *